Dec. 9, 1930.  W. J. STILL  1,784,396

POWER TRANSMISSION GEAR FOR INTERNAL COMBUSTION ENGINES

Filed May 1, 1924  4 Sheets-Sheet 1

Inventor
William Joseph Still
By
B. Singer, Atty.

Dec. 9, 1930.    W. J. STILL    1,784,396
POWER TRANSMISSION GEAR FOR INTERNAL COMBUSTION ENGINES
Filed May 1, 1924    4 Sheets-Sheet 2
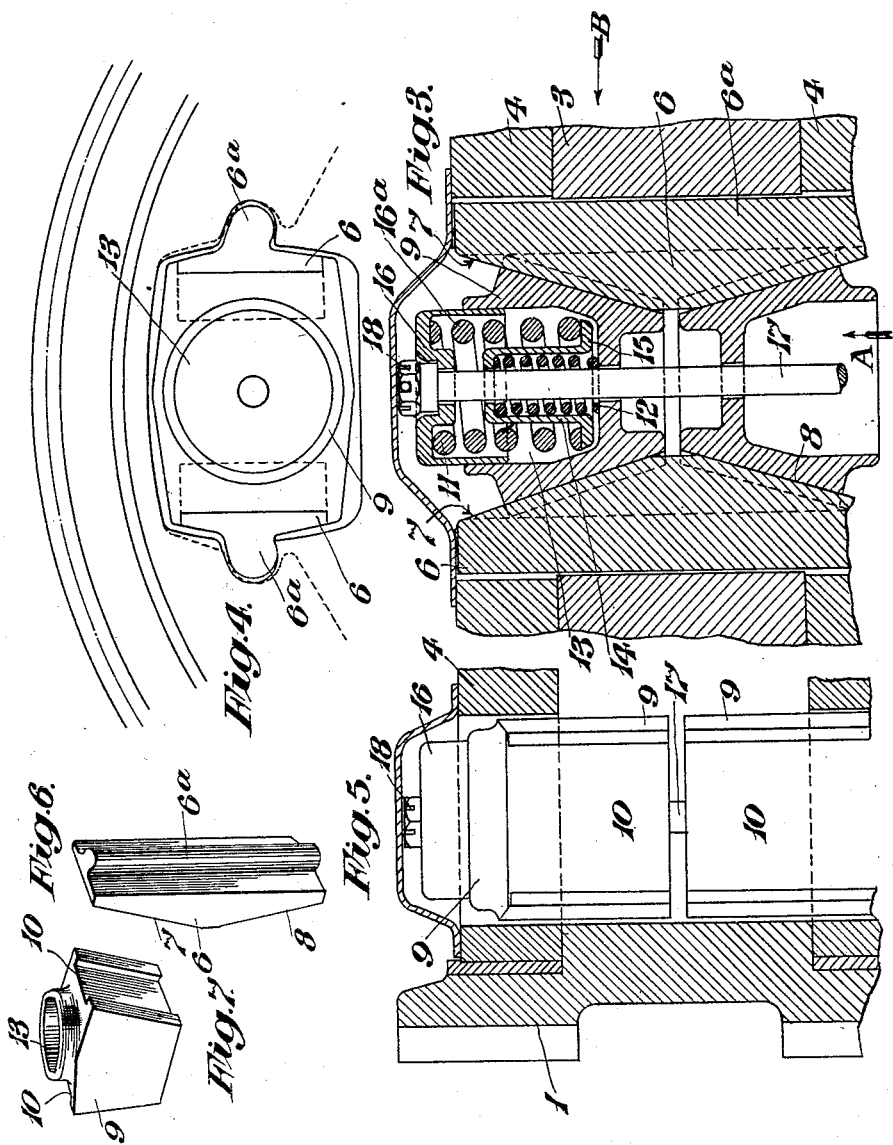

Dec. 9, 1930.  W. J. STILL  1,784,396
POWER TRANSMISSION GEAR FOR INTERNAL COMBUSTION ENGINES
Filed May 1, 1924  4 Sheets-Sheet 3
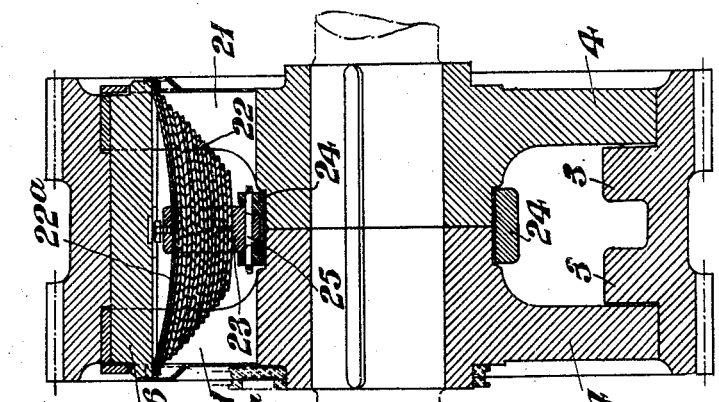
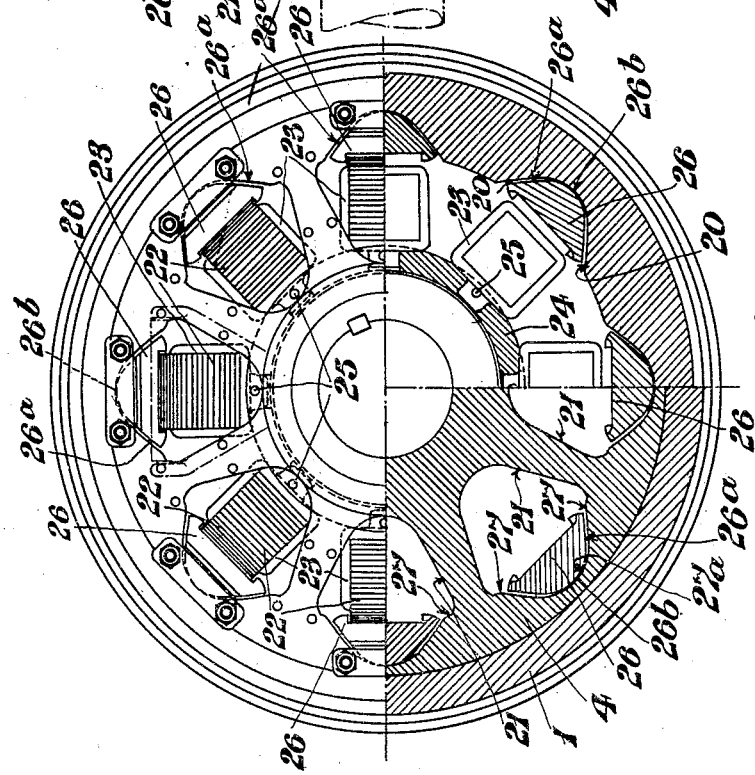

Dec. 9, 1930.   W. J. STILL   1,784,396
POWER TRANSMISSION GEAR FOR INTERNAL COMBUSTION ENGINES
Filed May 1, 1924   4 Sheets-Sheet 4

Patented Dec. 9, 1930

1,784,396

UNITED STATES PATENT OFFICE

WILLIAM JOSEPH STILL, OF LONDON, ENGLAND

POWER-TRANSMISSION GEAR FOR INTERNAL-COMBUSTION ENGINES

Application filed May 1, 1924, Serial No. 710,356, and in Great Britain May 14, 1923.

This invention relates to power transmission gear where varying impulsive torque is to be transmitted such as for example, in locomotives driven by engines or certain electric motors.

In drives of this character the driver and driven units are subject, when in motion, to oscillations which at a certain critical speed or speeds may become synchronized and cumulative in effect.

Further the inequalities of such drives demand the employment of an elastic flexible coupling usually embodying metal, fluid or other springs to cushion the blow produced by the varying impulsive torque or reaction of the driver or driven unit. In practice it is found that these springs in no way serve to obviate the dangerous and increasing oscillations which are produced as a result of synchronisms between the two units themselves or between either or both and the springs.

The object of the present invention is to provide means in a flexible coupling which will damp such oscillations and prevent them from exceeding the limit of safety or convenience.

This is effected according to the present invention by the use of frictional surfaces interposed between the driving and driven members of a flexible coupling forming part of the power transmission gear.

The invention may therefore be said to consist broadly of a power transmission gear comprising a flexible coupling the relative movements between the parts of which are controlled by springs, wherein the load is imparted to such springs through frictional surfaces which offer such resistance to relative movement between the parts of the coupling as to damp the oscillations due to varying torque or reaction and prevent them from exceeding the limit of safety or convenience.

The invention may be carried into effect by the employment of wedges which are moved to compress the springs by relative movement between the parts of the coupling and in order that the invention may be clearly understood two embodiments of the same in which such wedges are employed will now be described, by way of example, by aid of the accompanying drawings in which:—

Figure 3 is a fragmentary sectional plan through one of the elements shewing the dispositions of the wedges and springs.

Figure 4 is an elevation of the same with the springs removed and looking in the direction of the arrow A in Figure 3.

Figure 5 is a side view of the element looking in the direction of the arrow B in Figure 3 with the nearest wedge piece removed.

Figures 6 and 7 are perspective views of details hereafter to be referred to.

Figure 8 is a view similar to Figure 1 but illustrating the second embodiment of the invention in which laminated or leaf springs are employed.

Figure 9 is a radial section through the same.

Figure 2:
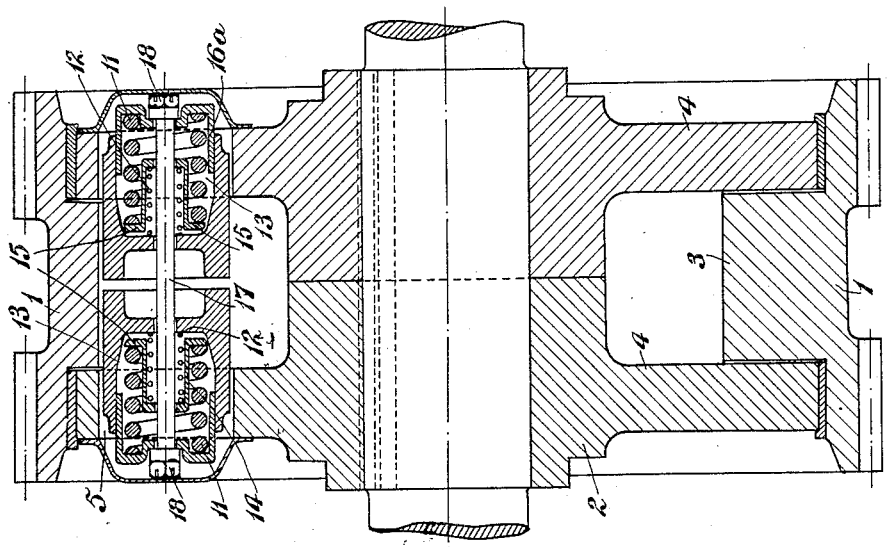
Figure 2 is a radial section through the same.
Figure 1:
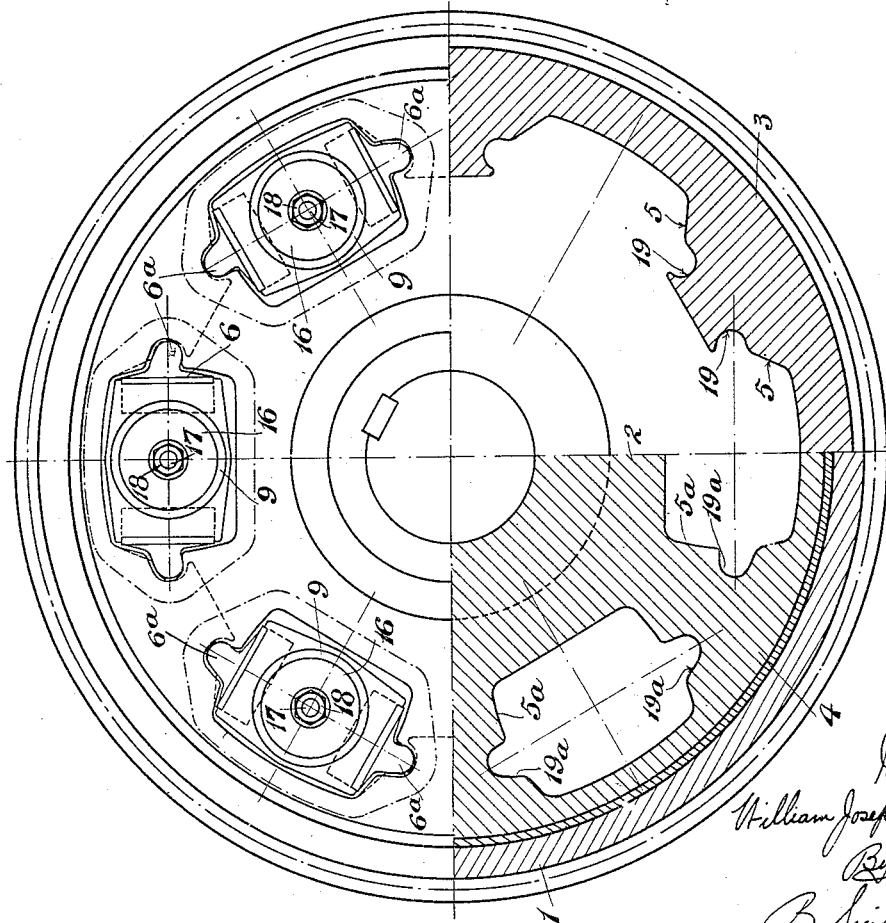
Figure 1 is a part sectional and part elevational view of a flexible coupling in the form of a toothed wheel particularly suitable for a locomotive and forming one embodiment of the invention in which coiled springs are employed.

Referring now to Figures 1 to 7 the embodiment therein illustrated consists of a flexible coupling in the form of a toothed wheel the rim 1 of which is mounted upon the nave or hub 2 so as to be free to move circumferentially relatively thereon. The rim and the nave or hub have intercalated flanges 3 and 4 respectively, the flange 3 being interposed centrally between the flanges 4. At intervals around the flanges 3 and 4 are cut or otherwise formed laterally extending aligned openings 5 and 5a respectively for the reception of what may be conveniently termed the damping spring units. These units in the present example consist of a pair of wedges 6 having oppositely inclined faces 7 and 8, a pair of spring housings 9 provided with faces 10 complementary to either the faces 7 or 8 of the wedges and forming grooves extending down opposite sides of the housings and inclined oppositely so as to converge towards each other at one end of the housing, a pair of concentric main and auxiliary springs 11 and 12 respectively located within a cup shaped recess 13 in each housing 9, a pair of supplementary housings 14 and cap members 16 and a tension bolt 17 with two nuts 18. The auxiliary springs 12 are enclosed within the supplementary housing 14 which is provided at its inner end with a laterally extending circumferential foot or flange 15 which serves as a support for the inner end of the main spring 11. Each main spring is completely enclosed by a cap member 16 having a depending skirt 16a which is a sliding fit within its recess 13. These cap members are mounted one upon each end of the bolt 17 which extends through the centre of both housings and the main and auxiliary springs. Nuts 18 on the extremities of the bolt serve to hold the cap members in position, thereby enclosing the springs, and to act as abutments for them. The wedges 6 are each formed with a raised substantially semi-circular tongue 6a, which tongues are adapted to engage in correspondingly shaped gaps 19 and 19a in opposite sides of the aligned openings 5 and 5a respectively.

As a consequence of relative movement between the rim 1 and the nave or hub 2 of the wheel caused by the torque transmitted, the wedges 6 are forced towards each other.

Under the wedging action so imposed the spring housings 9 are forced outwardly in a direction axial to the bolts 17 thus compressing first the auxiliary springs 12 and finally the main springs 11.

The effect of this wedging action is to produce a large amount of frictional resistance to movements between the rim and hub of the wheel. Any oscillations produced as a result of varying torque or reactions between the driver and driven units of the transmission gear are thus damped and prevented from exceeding the limit of safety or convenience by the frictional resistance of the wedges.

When relative movement between the rim and hub of the wheel occurs in one direction the tongue of one wedge is in contact with the gap 19a in the hub whilst the tongue of the other and opposite wedge is in contact with the gap 19 in the rim. When relative movement occurs in the opposite direction the engagement between the tongues and the gaps is reversed.

When vibratory oscillations occur at or about the undisplaced position, these reversals of contact between the tongues and gaps become very frequent and rapid, and, if these reversals took place instantaneously, impacts or shocks would be produced; in order that these shocks may be obviated, the tongues and gaps are so arranged that the engagement may take place gradually. To accomplish this, the gaps 19 and 19a are arranged in such a manner that, when the gear is in the undisplaced position, the tongues 6 do not bed fully into the gaps but contact at the points X and Y giving line contact.

When relative movement occurs between the rim and the hub of the wheel the tongues are caused to slide along the sides of the gaps until surface contact is brought about by the tongues seating fully on the bottom of their gaps in the rim and hub respectively and simultaneously. While this sliding movement is occurring between the tongues and the gaps the auxiliary springs 12 only are being compressed and by the time surface contact occurs between the tongues and the bottoms of their gaps these auxiliary springs are fully compressed and the main springs 11 come into action, the object of such auxiliary springs being to ensure that during the period of line contact between the parts the same will only be subjected to a comparatively light pressure.

Figure 10:
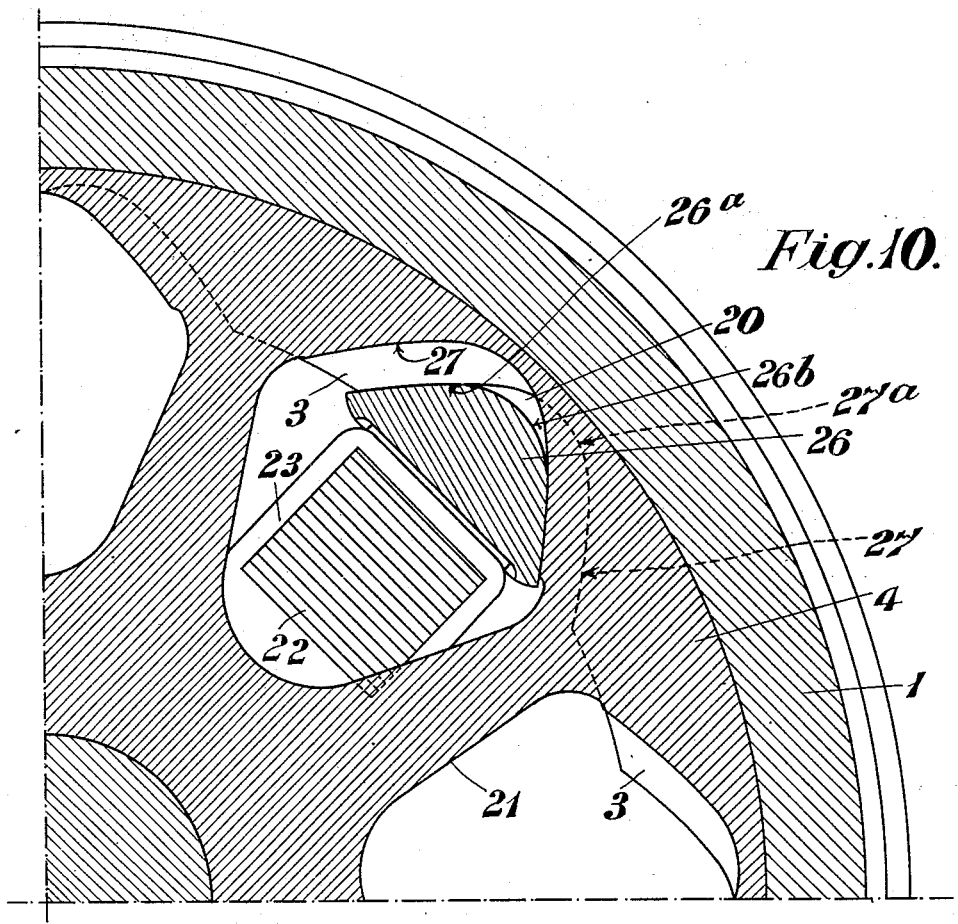
Figure 10 is an enlarged fragment of the wheel showing the positions of the parts when the springs are fully compressed.

In the embodiment illustrated in Figures 8 to 10 the intercalating flanges 3 and 4 are similarly provided with laterally extending aligned openings 20 and 21 respectively for the reception of the spring units. In this embodiment the spring units comprise a laminated or leaf spring 22, the buckle 23 of which is attached to a coupling ring 24 by pins 25.

The outer plate 22a of each leaf spring is of lighter section than the others and such outer plate is bent to a smaller radius whereby its extremities are normally separated from the lower plates, such extremities bearing against the undersurface of wedges 26 which wedges in this example are in the form of bolsters.

The outer surfaces of these wedges consist of two inclined curved sides 26a joined together by a blunt substantially semi-circular nose 26b.

The aligned openings 20 in the rim and 21 in the hub also have inclined curved sides 27 on each joined together by a substantially semi-circular hollow 27a. The sides 27 of the openings are similarly shaped and agrees in radius with the sides 26a of the wedges, but the semi-circular hollow 27a is of different radius from the semi-circular nose 26b of the wedges, so that in the undisplaced position of the parts line contact only occurs between the nose of each wedge opening 20 and 21, but when relative movement occurs between the rim and the hub of the wheel the wedges are caused to slide along the surface of the openings until surface contact is brought about between the curved sides 26a of the wedges and the sides 27 of the openings. The parts are then in the position shown in Figure 10.

It will thus be seen that relative movement between the rim and the nave or hub of the wheel, in the present example, serves to force the wedges 26 radially inwards against the action of the springs which are accordingly compressed.

It will further be seen that these relative movements between the rim and the hub of the wheel are gradually resisted first by the light pressure of the outer plate 22a and finally by the full pressure of the whole spring. The object of thus employing a light outer plate to each spring is to ensure that during the period of line contact between the parts the same will only be subjected to a comparatively light pressure.

In either embodiment the heat produced by the friction between the contacting surfaces may be carried away by immersing the parts in oil, a circulation of which can be mechanically or otherwise produced.

A flexible coupling according to this invention is particularly applicable to locomotives driven by internal combustion engines, such, for example, of the kind described in the specification of patent application Ser. No. 627,849. Such a coupling is however clearly also applicable to any form of apparatus in which a varying impulsive torque is to be applied.

What I claim and desire to secure by Letters Patent is:—

1. A power transmission gear comprising a flexible coupling in the form of a wheel, comprising a rim and a nave or hub, said rim being mounted on the nave or hub for relative circumferential movement, said rim and hub having intercalated flanges on their opposing faces and also having openings in said intercalated flanges adapted to register with each other in the undisplaced position of the parts of the coupling, wedges located in and bridging said openings and springs acting on the wedges and tending to resist any relative movement between the rim and the nave or hub thereby damping the oscillations, the arrangement being such that relative movement between the rim and the nave or hub causes the wedges to be moved and to compress their respective springs.

2. A power transmission gear comprising a flexible coupling in the form of a wheel which comprises a rim and a nave or hub, said rim being mounted on the nave or hub for relative circumferential movement and said rim and hub having intercalated flanges on their opposing sides and also provided with openings in said flanges arranged to register with each other in the undisplaced position of the said rim and hub, wedges arranged in and bridging said openings, relatively heavy springs whereby the greater movements of said members are resisted, said springs being arranged in pairs and each having a housing provided with inwardly tapered faces coacting with said wedges auxiliary housings in said springs and against which the inner ends of said springs bear, and relatively light springs arranged in said auxiliary housings and bearing between the same and the first named housings to resist small relative movements from the undisplaced position between the rim and the nave or hub.

3. A power transmission gear as in claim 1, wherein each wedge is formed with a raised substantially semi-circular tongue which engages correspondingly shaped surfaces in gaps in opposite sides of the openings in the intercalated flanges of the rim and hub of the wheel.

4. A power transmission gear comprising in combination a driving unit and a driven unit, intercalating flanges on said units, said flanges having transverse and aligned openings arranged at intervals, springs located within said openings, a pair of members having inclined surfaces movable relatively to each other and with said intercalating flanges and a member associated with each spring and having oppositely inclined faces complementary to and coacting with each pair of said first named members, all of said members being displaced simultaneously by the opposing movement of their cooperating inclined surfaces, such movements serving to compress the springs when the gear is under load.

5. A power transmission gear comprising a flexible coupling in the form of a wheel, the rim of which is mounted upon the nave or hub so as to be capable of relative circumferential movement, intercalated flanges on the opposing faces of the rim and the hub, openings in said intercalated flanges adapted to register with each other in the undisplaced position of the parts of the coupling, wedges located in and bridging said openings, a pair of members each having a pair of oppositely inclined surfaces engaging those of the wedges and springs acting on said pair of members and tending to resist any relative movement between the rim and the nave or hub thereby damping the oscillations, the arrangement being such that relative movement between the rim and the nave or hub causes the wedges to be compressed between the said pair of members and to be moved to compress their respective springs.

6. A power transmission gear comprising a flexible coupling in the form of a wheel, the rim of which is mounted upon the nave or hub so as to be capable of relative circumferential movement, intercalated flanges on the opposing faces of the rim and the nave or hub, openings in said intercalated flanges adapted to register with each other in the undisplaced position of the parts of the coupling, a pair of wedges located in and bridging each of said openings and means for resisting the relative movements between the parts comprising helical compression springs arranged in pairs and a housing in which each spring is located, and having two inwardly tapered faces with which faces each said pair of wedges coact in such a manner that any relative movement between the rim and the hub or nave of the wheel causes these wedges to be moved towards each other to force the individual housings of each pair of housings outwardly from each other so as to compress the springs between such housings against suitable abutments.

7. A power transmission gear comprising a flexible coupling in the form of a wheel rim and a hub, the rim being mounted upon the nave or hub so as to be capable of relative circumferential movement, intercalated flanges on the opposing faces of the rim and the nave or hub, openings in said intercalated flanges adapted to register with each other in the normal position of the parts of the coupling, wedges located in and bridging said openings, light springs arranged to resist small relative movements between the rim and the nave of the wheel and larger springs arranged to resist greater movements between said rim and nave, and wedge members causing said springs to act on said first named wedges, during relative movement between the rim and the nave of the wheel.

8. In a power transmission gear in combination, driving and driven units, intercalated flanges on the opposing faces of said units, openings in said flanges, gaps in opposite sides of said openings, housings located in said openings and having oppositely inclined surfaces, springs in said housings, wedges cooperating with said inclined surfaces of said housings and adapted to move said housings to compress said springs upon relative movement between said units, and semi-circular tongues on said wedges adapted to engage the gaps on the opposite sides of said openings.

9. In a rotary power transmission gear in combination, rotary driving and driven units, springs arranged parallel to the axis of said units, two cooperating inclined surfaces provided on the driving and driven units respectively, and a wedge member interposed between the pairs of inclined surfaces and held thereby the spring, the spring being arranged to force the wedge member into contact with the inclined surfaces to resist relatively rotary movements between said driving and driven units when the gear is under load.

In witness whereof I affix my signature.

WILLIAM JOSEPH STILL.